(12) United States Patent
Zhang et al.

(10) Patent No.: US 9,025,864 B2
(45) Date of Patent: May 5, 2015

(54) IMAGE CLUSTERING USING A PERSONAL CLOTHING MODEL

(75) Inventors: Tong Zhang, Palo Alto, CA (US); Wei Zhang, Beijing (CN); Daniel R Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 150 days.

(21) Appl. No.: 13/700,820

(22) PCT Filed: Aug. 2, 2010

(86) PCT No.: PCT/US2010/044142
§ 371 (c)(1),
(2), (4) Date: Feb. 1, 2013

(87) PCT Pub. No.: WO2011/152844
PCT Pub. Date: Dec. 8, 2011

(65) Prior Publication Data
US 2013/0142423 A1    Jun. 6, 2013

Related U.S. Application Data

(60) Provisional application No. 61/350,464, filed on Jun. 1, 2010.

(51) Int. Cl.
*G06K 9/62*     (2006.01)
*G06K 9/00*     (2006.01)

(52) U.S. Cl.
CPC .......... *G06K 9/6256* (2013.01); *G06K 9/00677* (2013.01)

(58) Field of Classification Search
CPC . A01G 1/044; B01F 13/0035; B01F 15/0201; B01F 15/025; G06K 9/00677; G06K 9/6218; G06K 9/6256; H04N 9/3147; H04N 9/3161; H04N 9/3197; G06Q 10/067; G06Q 10/087; G06Q 10/10; G06Q 30/02
USPC .................. 382/159, 103, 225; 348/143, 744, 348/E5.024, E7.078, E7.085, 25, 14, 207.1, 348/745, 840; 705/1.1, 26.1, 26.7, 30, 348; 704/E21.001, 270; 235/385; 425/62
See application file for complete search history.

(56) References Cited

U.S. PATENT DOCUMENTS

2005/0234782 A1*   10/2005   Schackne et al. ............... 705/27
2007/0237364 A1*   10/2007   Song et al. .................... 382/115

FOREIGN PATENT DOCUMENTS

JP     2007272896     10/2007
JP     2007272897     10/2007

OTHER PUBLICATIONS

Gallagher, AC.; Tsuhan Chen, discloses "Clothing cosegmentation for recognizing people," Computer Vision and Pattern Recognition, (2008. CVPR 2008. IEEE Conference on , vol., No., pp. 1,8, Jun. 23-28, 2008.*

Gallagher, Andrew C et al, "Clothing Cosegmentation for Recognizing People", IEEE Conf on Computer Vision and Pattern Recognition Alaska, 2008, pp. 1-8.

* cited by examiner

*Primary Examiner* — Sheela Chawan

(57) ABSTRACT

The disclosure relates to a system and a method for generating clothing feature data representative of at least one clothing feature of a piece of clothing being worn by the person in a set of images, and training a discriminative clothing classifier using the clothing feature data to provide a personal clothing model that corresponds to the piece of clothing. The personal clothing model can be used to identify additional images in which the person appears.

21 Claims, 6 Drawing Sheets

IMAGE CLUSTERING USING A PERSONAL CLOTHING MODEL

BACKGROUND

Clothing information can be used with face detection and face recognition for person clustering in images. For example, clothing clustering can be used to provide additional information to complement face-based clustering for improved person clustering in, for example but not limited to, family photos. Examples are disclosed in D. Anguelov, K. Lee, S. Gokturk, B. Sumengen, "Contextual identity recognition in personal photo albums," CVPR 2007; J. Cui, F. Wen, R. Xiao, Y. Tian and X. Tang, "EasyAlbum: An interactive photo annotation system based on face clustering and re-ranking," CH 2007; A. C. Gallagher and T. Chen. "Using context to recognize people in consumer images," IPSJ Transactions on Computer Vision and Applications, 2009; J. Sivic, C. L. Zitnick and R. Szeliski. "Finding people in repeated shot of the same scene," BMVC, 2006; Y. Song and T. Leung, "Context-aided human recognition—clustering," ECCV 2006. A system and method for classifying an image that uses a personal clothing model developed based on clothing information in images would be beneficial.

DETAILED DESCRIPTION

Figure 1A:
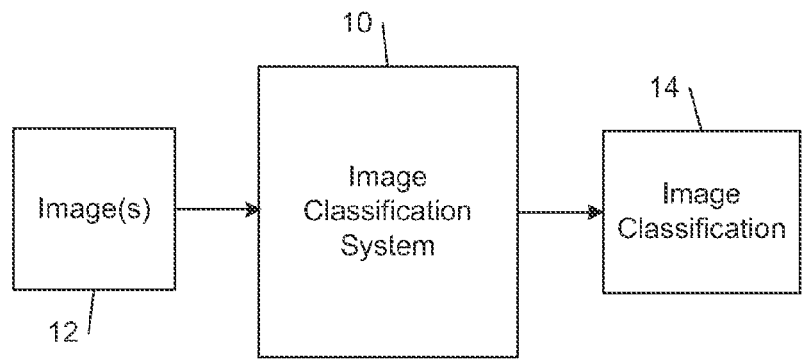
FIG. 1A is a block diagram of an example of an image classification system using a personal clothing model.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The term "image forming element" refers to an addressable region of an image. In some examples, the image forming elements correspond to pixels, which are the smallest addressable units of an image. Each image forming element has at least one respective "image value" that is represented by one or more bits. For example, an image forming element in the RGB color space includes a respective image value for each of the colors (such as but not limited to red, green, and blue), where each of the image values may be represented by one or more bits.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any medium capable storing information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and OD-ROM/RAM.

As used herein, the term "includes" means includes but not limited to, the term "including" means including but not limited to. The term "based on" means based at least in part on.

A system and method are provided herein for learning a generative clothing model and a discriminative clothing model that includes contextual information for each major face cluster. The personal clothing model is a result obtained from application of a generative clothing model and a discriminative clothing model to data representative of clothing regions in images. A system and method also are provided herein for applying the personal clothing model, learned from the generative clothing model and the discriminative clothing model, to efficiently detect a person in an image that may not be detectable by solely face-based detection (and hence was placed in a non-major face cluster). The system and method can further include merging the non-major face clusters into the corresponding major face cluster. The use of the generative clothing model and discriminative clothing model disclosed herein can significantly improve the results of image identification, including image identification that results from the performance of face clustering. For example, use of the generative clothing model and discriminative clothing model can provide for improved person retrieval in images and improved person clustering. Thus, a system and method are provided for clustering images based at least in part on application of the generative clothing model and discriminative clothing model.

In a system and method disclosed herein, the face clusters can be generated automatically through face detection and face recognition. All images in a given major face cluster have at least one person in common. However, a given person may be contained is several clusters as they appear in several images. Therefore, for a given person, there can be a large cluster and several small clusters. Many clusters can be small, and contain only one or two images. Herein, the larger clusters that can be associated with a person of interest, for example, clusters that contain images with at least the person of interest in common, are referred to herein as "major face clusters." The other clusters, including smaller clusters that may include the person, are referred to as "non-major face clusters." The designation of a cluster as a major cluster vs. a non-major cluster can be determined is different ways. In one example, a predetermined threshold content of images in a cluster can be used to designate a cluster as a major cluster or a non-major cluster. For example, all clusters containing N or more images are designated as major clusters, where N is any integer number greater than or equal to 4. For example, N can be between 4 and 10, or greater than 10.

A system and method also are provided herein for learning personal clothing models corresponding to the computed major face clusters to describe each individual's clothing appearance across time. For example, multiple instances of the same clothing can be jointly modeled to describe the appearance of the clothing in differing background settings and differing conditions (including lighting conditions). Application of the generative clothing model and discriminative clothing model with clothing clustering for person clustering or person retrieval can provide more information and more accurate results than solely, for example, face detection-based clustering. The learned generative clothing model and discriminative clothing model can be used not only to improve the performance of face recognition, but also face detection.

In the implementation of the system and method disclosed herein, for a plurality of images, major face clusters of the plurality of images are provided. A generative clothing model and discriminative clothing model with embedded contextual information is learned using the major face clusters. The learned generative clothing model and discriminative clothing model is applied for person retrieval and for face cluster merging.

A system and method also are provided herein for learning a generative clothing model and discriminative clothing model that includes contextual information for each major face cluster and using the learned generative clothing model and discriminative clothing model to explore and retrieve the complementary clothing information in images.

FIG. 1A shows an example of an image classification system 10 that performs image classification using the learned personal model on images 12 and outputs an image classification 14. Image classification 14 can be information indicative of a classification of the image 12, including an indication of whether a person of interest appears in image 12. In some examples, the image classification 14 can be an updated major face cluster that contains the newly classified image. In another example, the image classification 14 is an indication of whether an image 12 can be grouped with a major face cluster to provide the updated major face cluster. In the implementation of the image classification system 10, a personal clothing model described herein is applied to an image 12 to be classified. For example, a personal clothing model described herein can be applied to clothing features extracted from the clothing regions of image 12. In this way, image classification system 10 can provide a fully automated process for classifying images or merging clusters images. In an example, to provide the clothing features extracted from the clothing regions of an image 12, the clothing regions of image 12 are detected and segmented from the image, and the clothing features are extracted from the segmented clothing regions. In some examples, the image classification system 10 outputs image classification 14 by storing an updated major face cluster, or an indication of the classification of the image, in a data storage device (e.g., in a database), rendering it on a display (e.g., in a user interface generated by a software application program), or rendering it on a print medium (e.g., paper).

In general, the images 12 can be any type of images, including amateur and professional photographs and commercially produced images. In one example use scenario, images 12 in the form of personal photographs are provided. The image classification system 10 processes the images 12 and outputs the image classification 14. In this use scenario, the image classification system 10 allows consumers to classify family photos according to specific individuals using personal clothing models, for example, to create a personalized and themed photo album or photo slide presentation. The image classification system 10 also can help a person to explore his or her clothing favorites, which information can be used to organize his or her clothes efficiently. In another example use scenario, images 12 in the form of images captured by an image sensor or a processed versions of such images, or textual images, are provided. The image classification system 10 applies the classification based on personal clothing models to the images for improved person detection and/or identification.

An example source of images 12 is a family collection of photos, which can usually include the same family member, relatives, and friends. Another example source of images 12 is photo collections of, e.g., entertainment or sports celebrities, or reality television individuals. The images can be taken over a short span of time, or can have time stamps that extend over several years, such as but not limited to family photos or celebrity images over 10 yrs. An example of images that span a short space of time is consumer photos taken in burst mode, at a family event or while on vacation. In an example use scenario, a system and method disclosed herein is applied to images in a database of images, such as but not limited to images captured from imaging devices (such as but not limited to surveillance devices, or film footage) located at an airport, a stadium, a restaurant, a mall, outside building, etc., to train the personal clothing model using a generative clothing model and a discriminative clothing model as described herein. In another example use scenario, a trained personal clothing model is applied to images in a database of images, such as but not limited to images captured from imaging devices (such as but not limited to surveillance devices, or film footage) located at an airport, a stadium, a restaurant, a mall, outside building, etc., to identify images that include one or more persons of interest. In an example implementation, a system and method disclosed herein can be used to locate a missing child at an amusement park, an incapacitated person in need of assistance, a person who has wandered away from an area and become lost, or a criminal attempting to hide in a monitored location (such as but not limited to buildings, sporting events, concerts, city centers, airports, etc.) for example, based on images provided of clothes worn by the individual, although it will be appreciated that other uses are possible. Accordingly, if installed in a monitored location, an implementation for locating a target individual or individuals is able to start producing candidate individuals and their locations as soon as search criteria are entered into the system.

Figure 1B:
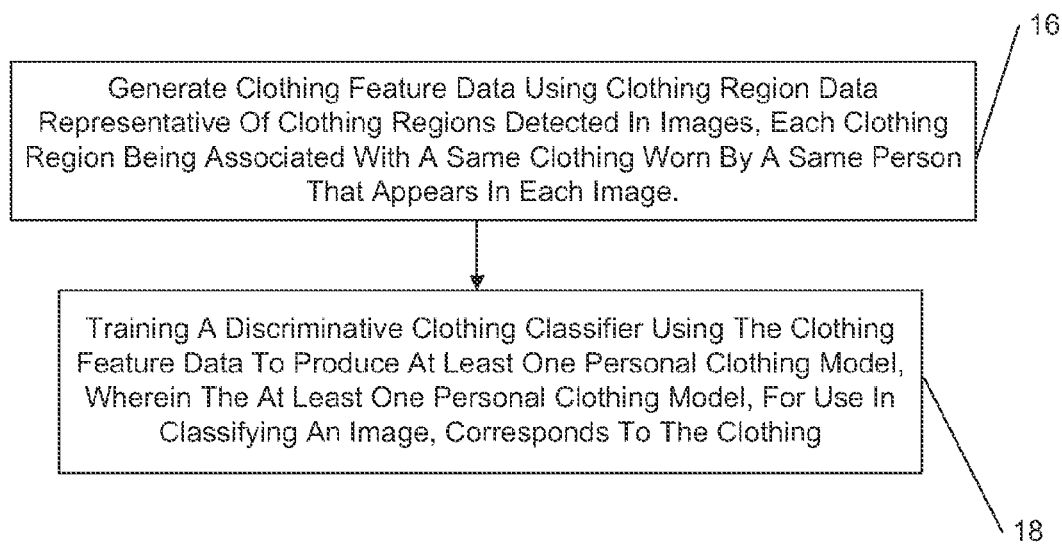
FIG. 1B shows a flow chart of an example method for generating a personal clothing model.
Figure 2:
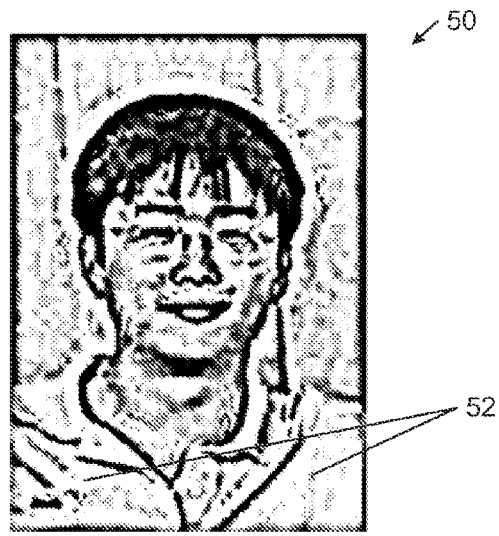
FIG. 2 shows an example image.

FIG. 1B shows a flow chart of an example process for image classification. In block 16, clothing feature data are generated from clothing region data. The clothing region data are representative of clothing regions detected in each image of a subset of images from a collection, where the clothing regions are associated with a same clothing being worn by a same person that appears in each image of the subset. FIG. 2 shows an example of an image 50 from which clothing region data can be generated, where the clothing region data is representative of clothing regions 52 in the image of the clothing worn by the person. The clothing feature data are representative of clothing features of the clothing, and are extracted from the clothing region data. In block 18, a discriminative clothing classifier is trained using the clothing feature data to produce at least one personal clothing model that corresponds to the clothing. The at least one personal clothing model can be used for classifying images in the collection that are not in the subset.

Figure 3A:
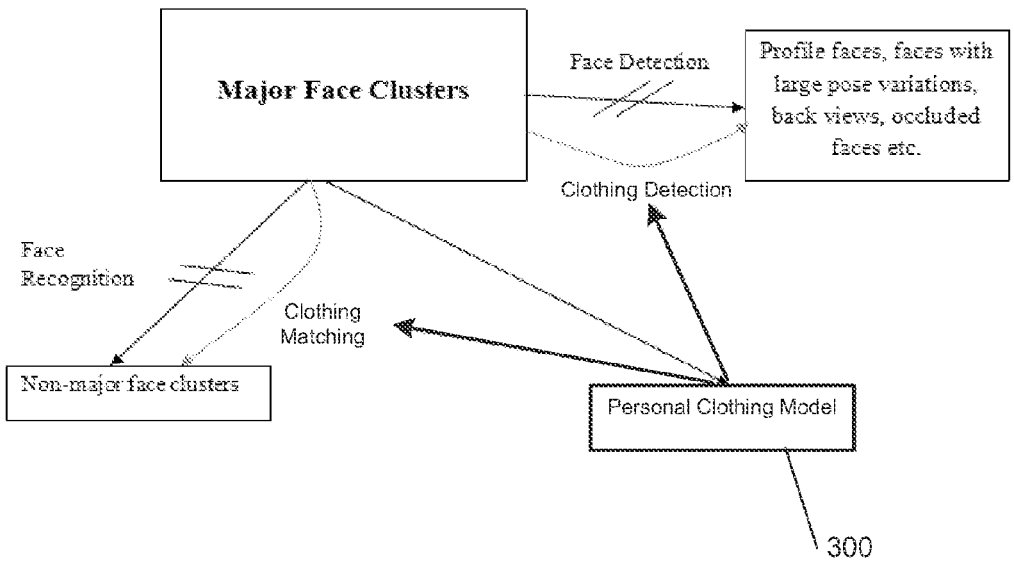
FIG. 3A is a block diagram of an example method of image classification using a personal clothing model.

FIG. 3A illustrates example uses of the personal clothing model. As depicted in FIG. 3A, clothing detection using the personal clothing model 300, along with face detection, can be applied to the major face clusters to provide results including images with profile cases, faces with large pose variations, back views, and occluded faces. As also depicted in FIG. 3A, clothing matching using the personal clothing model 300, along with face recognition, can be applied to the major face clusters to provide results including information concerning the non-major clusters. The personal clothing model is associated with clothing being worn by the person who is the person of interest in for the major face cluster. The personal clothing model 300 can be used to identify additional images, not in the major face cluster, in which the person of interest appears. The additional images that are identified using the personal clothing model 300 can be added to the major face cluster to provide an updated major face cluster.

Figure 3B:
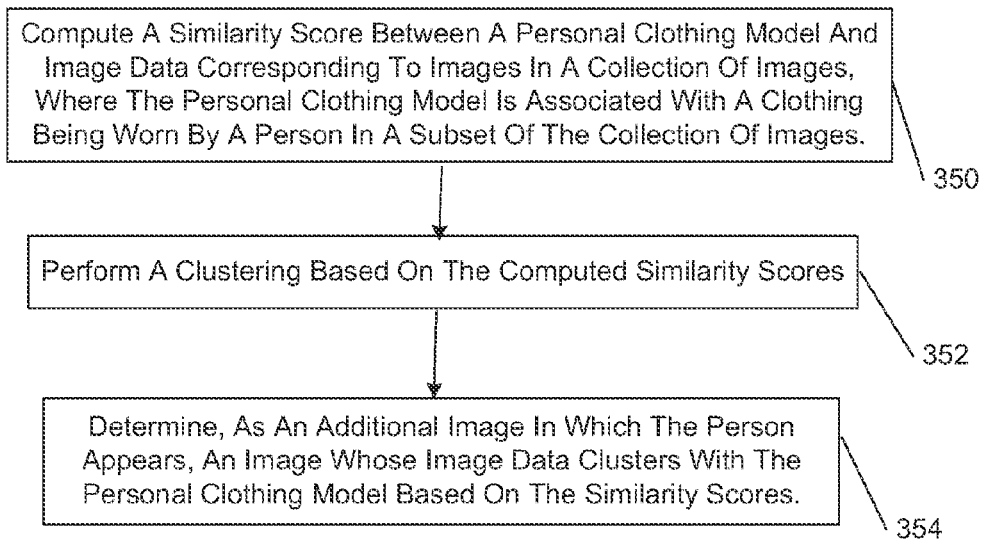
FIG. 3B is a block diagram of an example method of using a personal clothing model to classify an image.

FIG. 3B shows a flow chart of an example use of the personal clothing model for image identification. In block 350, a similarity score is computed between the personal clothing model and clothing feature data extracted from image data corresponding to images in the collection of images. "Image data" herein refers to data representative of the image, including data representative of image forming elements of the image or to image values. The personal clothing model is associated with clothing being worn by a person of interest in a subset of the collection (the major face cluster). In block 352, a clustering is performed based on the similarity scores. Any clustering algorithm can be used to perform the clustering. In block 354, additional images in which the person of interest appears are identified as those images whose clothing feature data clusters with the personal clothing model based on the similarity scores.

A personal clothing model can be generated to include time of capture information. For example, the personal clothing model can be generated that includes a range of time of capture of some or all of the images in the major face cluster.

In one example, a personal clothing model that includes time of capture information can be applied only to images in a collection that were captured at a time period that falls within this range of time of capture. In this example, a similarity score can be computed between the personal clothing model and clothing feature data extracted from image data corresponding to images in the collection of images that were captured in the specified range of time, to identify additional images in the collection that are not in a major face cluster. A clustering is performed based on the similarity scores, and the additional images in which the person of interest appears are identified as those images whose clothing feature data clusters with the personal clothing model based on the similarity scores.

Figure 4:
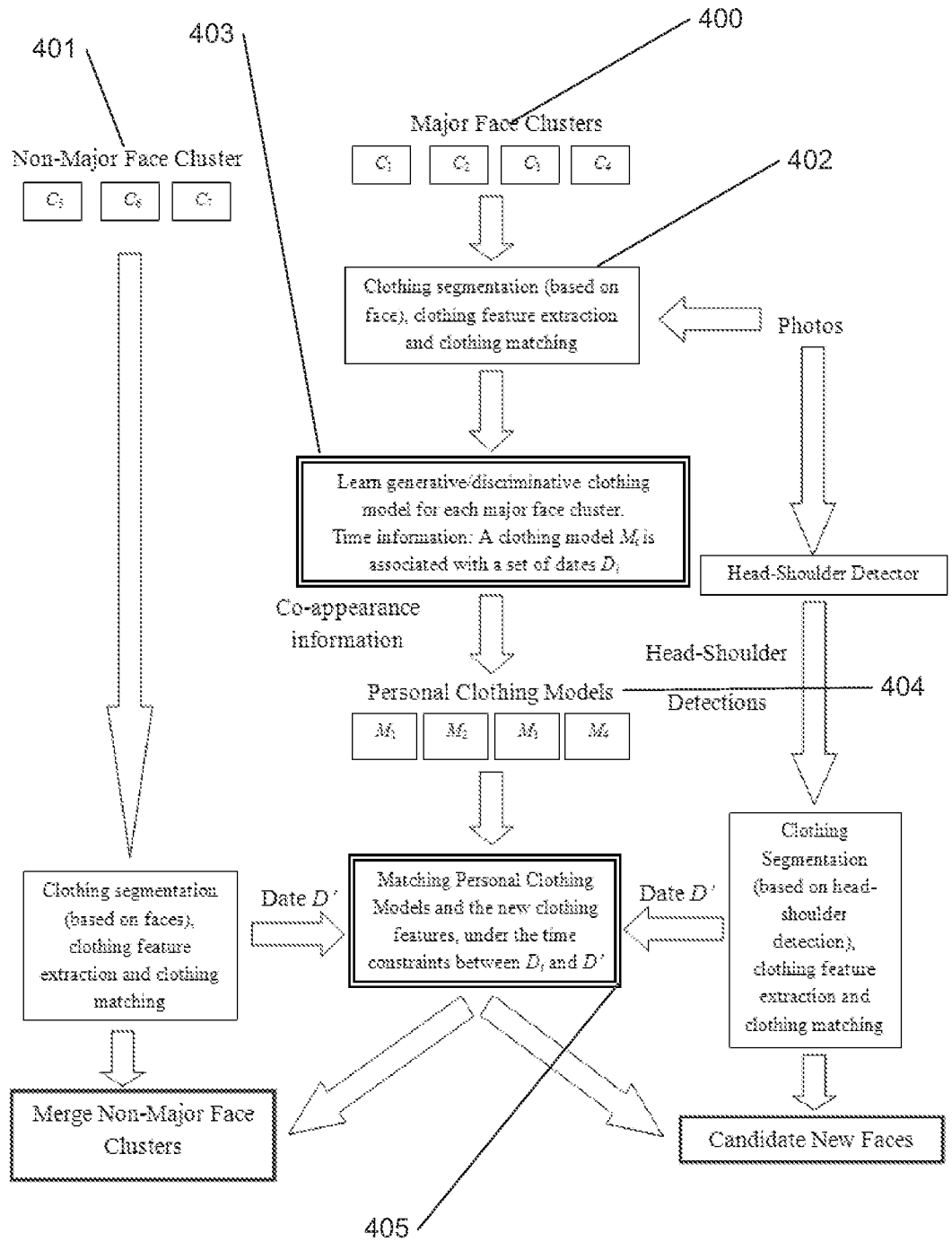
FIG. 4 is a flow diagram of an example method for image classification using personal clothing models.

FIG. 4 shows an example flow diagram of framework of a system and method disclosed herein. As depicted in block 403, the method involves learning personal clothing model for each major face cluster by learning a generative clothing model and a discriminative clothing model for each major face cluster. The personal clothing model is learned with contextual information embedded in the major face cluster. As depicted in block 404 of FIG. 4, the methods can also involve application of the learned personal clothing models to person retrieval and face cluster merging.

Figure 5:
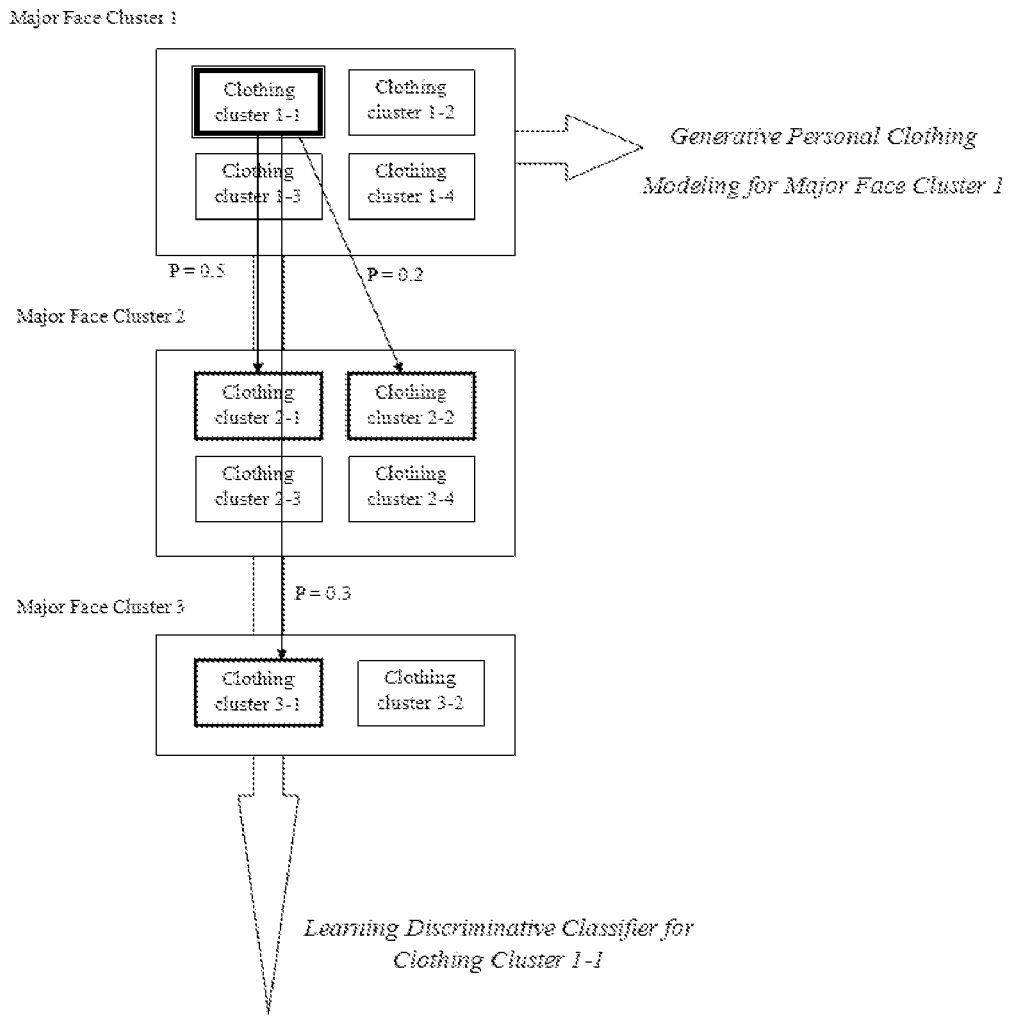
FIG. 5 is a diagrammatic view of an example process for generative clothing model and discriminative clothing model learning.

The process of the clothing model learning method is illustrated in FIGS. 4 and 5. The process of learning the generative/discriminative clothing model, as depicted in FIG. 4, can be performed as follows. Major face clusters ($C_1, C_2, C_3, C_4$), generated from the images 12, are received in blocks 400. The major face clusters ($C_1, C_2, C_3, C_4$) and non-major face clusters ($C_5, C_6, C_7$) in block 401 can be generated by any method. For example, the major face clusters and non-major face clusters can be generated by face detection. Face detection can be applied to detect at least one face region in the images, for example, using a face detection algorithm. The face detection can be performed on the image forming elements of the images. As depicted in FIG. 5, for each face in a major face cluster i, the clothing regions are detected and the generative clothing features are extracted from the clothing regions. As depicted in block 402, clothing segmentation based on the face detection of the person of interest, clothing feature extraction and clothing matching can be performed using image data to provide data representative of the clothing regions in the images.

The detection and segmentation of the clothing region can be performed by any method. An example method for clothing region detection and segmentation is as follows. At least one skin region is segmented from the at least one detected face region. The skin tone of the at least one person in the at least one detected face region is extracted. Extraction of the skin tone can involve clustering the pixels densely sampled in the skin regions. The extracted clothing features associated with a person in an image can be used to detect that person in a second image. The extracted skin tone of the at least one person is used to remove the skin region from the detected face region to provide the hair tone of the at least one person. The extracted skin tone and the hair tone are used to remove skin regions and hair regions from the first image to provide the clothing regions. In sum, the rough location of clothing region within the images is detected. Refined clothing information is obtained through segmentation of the images involving skin region and/or hair region removal. The clothing region detection and segmentation of can be performed on the image forming elements of the images.

The system and method can further involve clothing feature extraction. The clothing feature can be extracted from data representative of clothing regions of an image. The generative clothing model is based on the clothing features extracted from the clothing regions of an image. The clothing feature extraction can be performed on the image forming elements of an image. Examples of the generative clothing features include the color signature (C) and the texture signature (T). The generative clothing features can be computed based on the pixel values densely sampled within the clothing region.

The clothing color signature feature (C) can be obtained by computing a Gaussian Mixture Modeling (GMM) with diagonal covariance matrix on the color pixels sampled in CIELab space at every 4 pixel within the clothing segmentation. CIELab is a mathematical derivative of a mathematical model produced by the Commission Internationale de l'Eclairage (CIE) that describes colors using three synthetic primaries: L (indicative of Lightness), a (indicative of red-greenness), and b (indicative of yellow-blueness). Color signature feature (C) describes the global distribution of the color pixels in CIELab space within the clothing region. It can be robust to imperfect clothing segmentation and background noise. This feature does not depend on local information of the pixels. Spatial relation can be of value for object matching and categorization. See, e.g., S. Lazebnik et at, "Beyond bags of features: spatial pyramid matching for recognizing natural scene categories," CVPR 2006. For clothing clustering, spatial information can be helpful for finding discriminative localized patterns on the clothing.

The texture feature of clothing can be extracted using a texture pyramid (T). A spatial pyramid can be used to compute the texture features with embedded spatial information. The extraction of the texture feature is similar to the extraction of the color pyramid feature. However, instead of learning the codebook and histogram on color pixels, they are learned on texture pixels. The computation involves densely sampling the texture pixels by convolving the refined clothing segmentation with multi-scale filter banks. An example filter set is disclosed in J. Winn, A. Criminisi, and T. Minka. "Object categorization by learned universal visual dictionary," ICCV 2005; it is composed of 9 Gaussians, 4 first order derivatives of Gaussians and 4 Laplacian of Gaussians (LoG), applied in CIELab channels. In this example, each texture pixel has a dimension of 17.

As illustrated in block 403, the method learns generative clothing model for major face cluster i based on the generative clothing features extracted from the images in the cluster. First, all the clothes in the face cluster are clustered. Any clothing clustering algorithm can be applicable. Then, a generative clothing model is learned to model the appearance and time information of the clothing clusters. In one example, a generative clothing model is learned to model the appearance and time information of all of the clothing clusters. In another example, a generative clothing model is learned to model the appearance and time information of the largest ones of the clothing clusters. Each component in the generative clothing model ($M^g_i$) can be represented using the concatenated color signature ($C_i$) and texture signature ($T_i$) of a clothing cluster, and the corresponding photo-capturing dates ($D_i$), such as $M^g_i=(C_i, T_i, D_i)$. The learning the generative and discriminative clothing models can be based on coarse-to-fine cascaded object detection (see, e.g., P. Viola et al., "Rapid object detection using a boosted cascade of simple features," IEEE Conf. Computer Vision Pattern Recognition, 2001) and a generative/discriminative classification methodology (see, e.g., Y. Li, et al., "A generative/discriminative learning algorithm for image classification," IEEE Conf. on Computer Vision, 2005).

Figure 6:
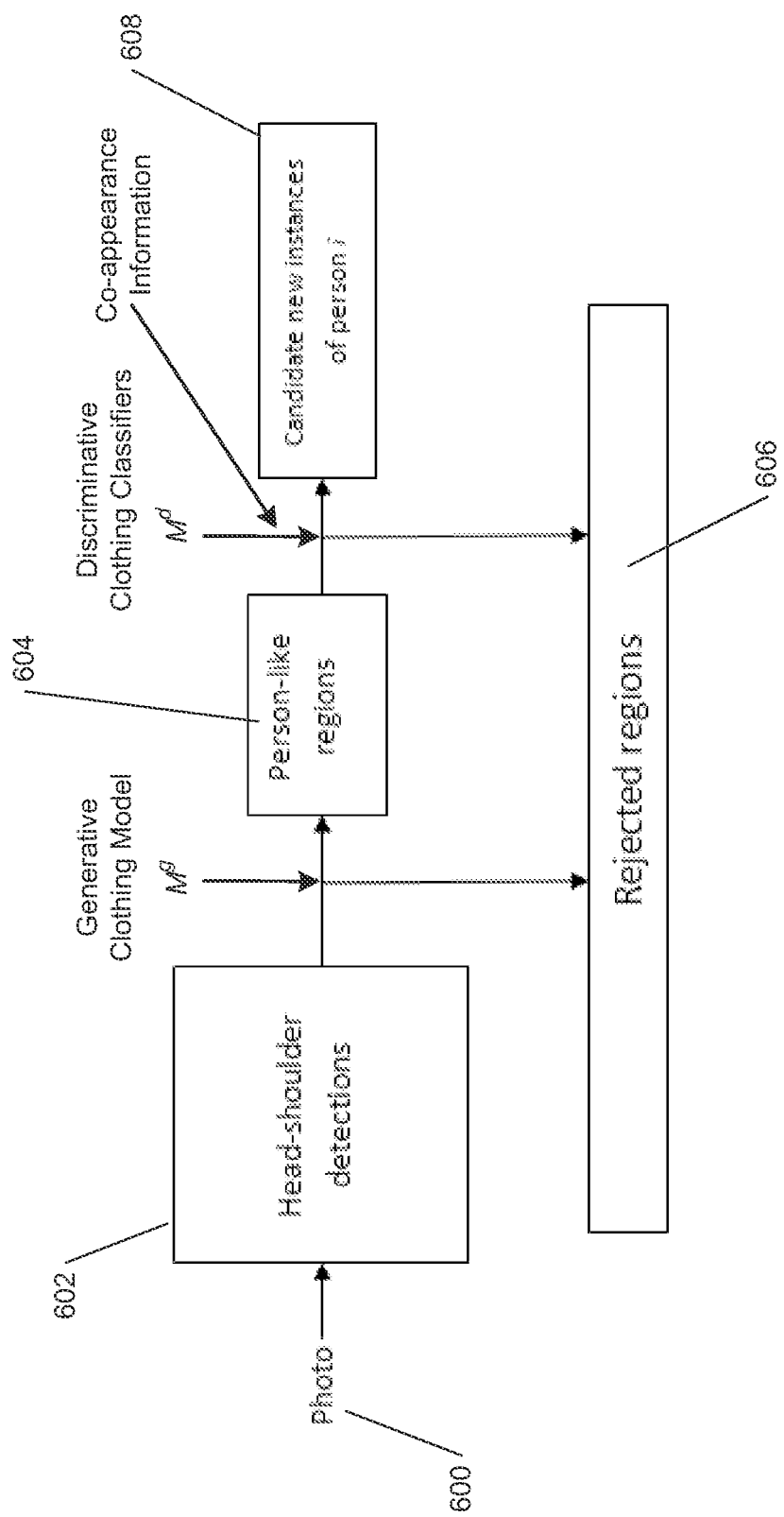
FIG. 6 is a diagrammatic view of an example person retrieval process using the learned generative clothing model and discriminative clothing model.

As illustrated in block 403, the method further involves learning discriminative clothing classifiers $M^d_k$ for a clothing duster k. In one example, the discriminative clothing classifiers $M^d_k$ is trained using positive training examples for a clothing duster k that appears in a predetermined number of N photos. In an example, the positive training examples is the generative clothing model generated based on the extracted clothing features (as described above). The discriminative clothing classifiers $M^d_k$ for can also be trained using negative training examples, i.e., clothing region data or other image data known not to be part of the positive training example. Examples of a discriminative clothing classifiers $M^d_k$ include a supervised clustering algorithm or a machine learning tool. To train the discriminative clothing classifiers $M^d_k$, the probabilities P that cluster k co-appears with other clothing clusters in the photos is first calculated. The probabilities P can be used to determine the co-appeared clothing clusters as the ones that are to be discriminated from clothing cluster k (i.e., for P>0). During person retrieval, the probabilities P also can be used to improve the detection performance by jointly detecting multiple people that co-appear frequently in the images. The generative model can be efficiently computed and applied to remove a large number of evident non-person regions. For discriminating the clothing from similar-looking background regions and other clothes that co-appears, a discriminative classifier $M^d_k$ is trained on a set of more extensive features to discriminate the regions in clothing cluster k (positives) from similar background regions in photos in clothing cluster k and from other clothing clusters that co-appears with cluster k (negatives), as depicted in FIGS. 5 and 6. The similarity is measured by the distance between the generative clothing model and the clothing feature data extracted from clothing regions. Examples of distance measures include the city block distance L1 and the Earth Mover's Distance (EMD). See, e.g., Y. Rubner et al., "The Earth Mover's distance as a metric for image retrieval," IJCV, 2000. The positive and negative training examples can be selected automatically.

The discriminative classifier $M^d_k$ can be learned on the discriminative clothing features extracted from the positive and negative training examples. In one example, the discriminative classifier $M^d_k$ is a bagging decision trees classifier. L. Breiman, "Bagging predictors", Machine Learning, vol. 24(2), pp. 123-140, 1996. To achieve a higher efficiency without little loss of descriptive power, Haar-like features can be used as low-level features. See, e.g., P. Viola et al., "Rapid object detection using a boosted cascade of simple features," IEEE Conf. Computer Vision Pattern Recognition, 2001. A visual codebook is learned on the Haar-like features extracted from positive examples. The codebook-based image feature vectors are input to the bagging decision trees classifier for classification. The decision of the classifier is either positive (new region belongs to clothing cluster k) or negative (new region does not belongs to clothing cluster k).

As depicted in block 404 of FIG. 4, personal clothing models ($M_1$, $M_2$, $M_3$, $M_4$) are generated as a result of the application of the generative clothing model and the discriminative clothing model to the clothing regions data. Each clothing model ($M_1$, $M_2$, $M_3$, $M_4$) can be associated with, and representative of, a piece of clothing being worn by the person of interest in a major face cluster. The personal clothing models are generated based on clothing co-appearance information in the major face clusters.

As depicted in block 405 of FIG. 4, the method and system can further involve application of learned personal clothing models for person retrieval and face cluster merging. For example, the learned personal clothing models can be applied to images that are not in the major face clusters, including images in non-major face clusters or new images that are not in any of the major face clusters or non-major face clusters, for person identification. Additional images identified by a given personal clothing model can be merged with the major face cluster corresponding to the person of interest based on whose clothing that personal clothing model was developed. The learned personal clothing models can be applied to image data representative of images that are not in the major face clusters by computation of similarity scores and clustering with the personal clothing model as described in connection with any method herein. In an example where the personal clothing models includes time of capture information (depicted in FIG. 4 as $D_i$), the personal clothing models can be applied only to images that were captured at a time period D' that falls within a specified time period around the range of time of capture if desired.

Once a personal clothing model is generated from the generative clothing model and the discriminative clothing model, it can be applied to other images without need to apply the generative clothing model or the discriminative clothing model. In order to compare an image to be classified (e.g., a new image or an image in a non-major face cluster) by extracting clothing feature data from the clothing regions of the image to be classified, and compare these extracted clothing features to the personal clothing model.

Similarly to clothing features, the personal clothing models can be expressed as a vector or matrix. Furthermore, a generated clothing model can be represented by more than one clothing feature vector (or matrix). For example, a personal clothing model for a piece of clothing can be expressed as multiple clothing feature vectors (or matrices), as a non-limiting example, the personal clothing model can be expressed as a clothing feature vector representative of the color of the piece of clothing and a clothing feature vector representative of the texture of the piece of clothing. In addition, in some examples, the personal clothing model can include a time constraint, such as time of capture, or a time interval around a time of capture.

In an example where the personal clothing model is expressed as a vector, the personal clothing model can be compared to clothing features extracted from the clothing regions of other images waiting to be classified by computing a Euclidean distance, or other distance measure. In an example, the component of the personal clothing model corresponding to the clothing feature vector representative of color can be compared to the color clothing features data of the other image waiting to be classified by computation of an Earth Movers Distance. In another example, the component of the personal clothing model corresponding to the clothing feature vector representative of texture can be compared to the texture clothing features data of the other image waiting to be classified by computation of a L1 distance (the Manhattan or city block distance, the sum of the (absolute) differences of their coordinates), a L2 distance (the Euclidean distance, the square root of the component-wise square of the difference between the vectors), or any other applicable distance measure. In related examples, the similarity score can be computed as a distance measure, D, between the personal clothing model and clothing feature data extracted from a clothing region that is obtained according to D=(DC+DT)/2, wherein DC is a color-based distance obtained by comparing the color signatures using the Earth Mover Distance metric, and wherein DT is a texture-based distance that is obtained by comparing texture signatures.

A flow diagram of an example person retrieval method using a personal clothing model is illustrated in FIG. 6. For an image (such as but not limited to a photo 600) captured in one of the days corresponding to clothing cluster k, the method first matches the clothing cluster k's generative model ($M^g$) to the head-shoulder detections 602 of the image. The result is the person-like regions 604 of the image. The similarity scores can be computed, for example, using a distance measure. In one example, the detections that have low similarity scores (for example, a threshold below a predetermined threshold score) can be rejected and discarded from further processing (depicted in FIG. 6 as rejected regions 606). The predetermined threshold can be user defined or computed based on previously collected data. In this example, the detections that have relatively high similarity scores (for example, a threshold above a predetermined threshold score) are subjected to a discriminative validation step. In a discriminative validation step, their discriminative features are extracted and then input to the discriminative classifier ($M^d$) corresponding to cluster k for classification. The final decision (candidate new instance 608) is given by a multiple classifier system that uses clothing co-appearance information. See, e.g., F. Roli Giorgio et al., 2001, "Methods for Designing Multiple Classifier Systems", *In Multiple Classifier Systems*.

An example of a method for face cluster merging is a follows. A clothing-based similarity between a major face cluster i and a non-major face cluster j is measured by applying the discriminative clothing classifier of face cluster i ($M^d_i$) to the clothes in face cluster j. In an example, face cluster i is a major face cluster and face cluster j is a non-major face cluster. The accumulated prediction output by the discriminative clothing classifier can indicate the confidence that cluster j should be merged into cluster i. For example, for an output by the discriminative clothing classifier below a threshold, the face cluster j can be rejected and thus not merged with face cluster i.

The image classification system 10 can be used for performing any of the processes described in the blocks of FIGS. 3A, 3B, 4, 5 and 6. For example, image classification system 10 can perform one or more of the computations described in the blocks of FIGS. 3A, 3B, 4, 5 and 6. The image classification system 10 can include one or more discrete data processing components, each of which may be in the form of any one of various commercially available data processing chips. In some implementations, the image classification system 10 is embedded in the hardware of any one of a wide variety of digital and analog computer devices, including desktop, workstation, and server computers. In some examples, the image classification system 10 executes process instructions (e.g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 7:
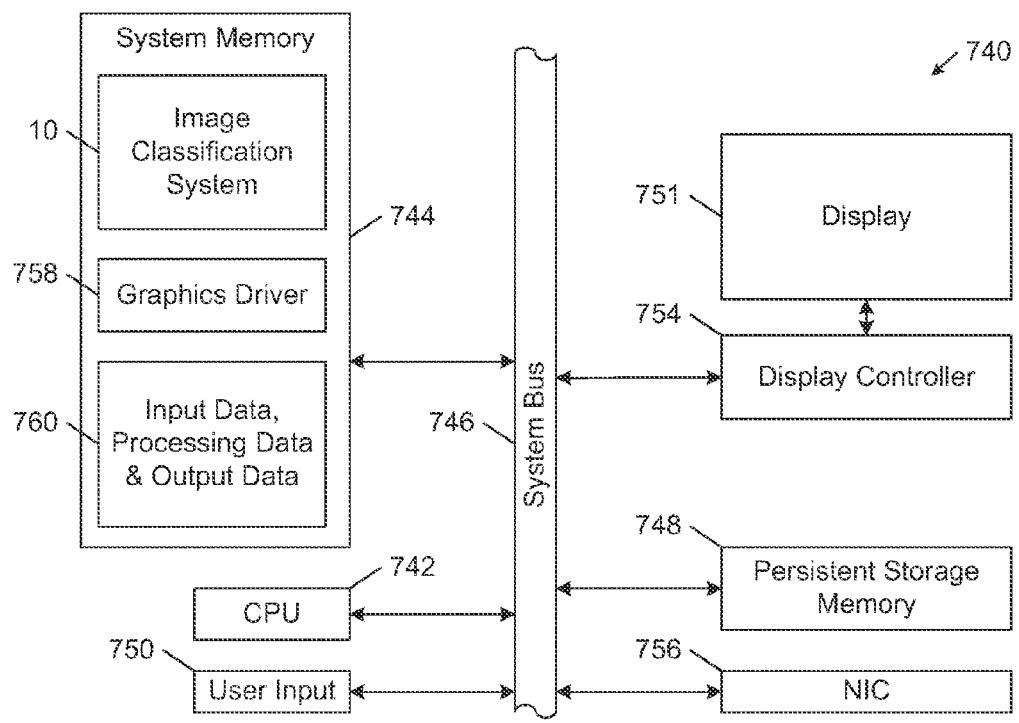
FIG. 7 is a block diagram of an example of a computer that incorporates an example of the image classification system of FIG. 1A.

FIG. 7 shows an example computer system 740 that can implement any of the examples of the image classification system 10 that are described herein. The computer system 740 includes a processing unit 742 (CPU), a system memory 744, and a system bus 746 that couples processing unit 742 to the various components of the computer system 740. The processing unit 742 typically includes one or more processors, each of which may be in the form of any one of various commercially available processors. The system memory 744 typically includes a read only memory (ROM) that stores a basic input/output system (BIOS) that contains start-up routines for the computer system 740 and a random access memory (RAM). The system bus 746 may be a memory bus, a peripheral bus or a local bus, and may be compatible with any of a variety of bus protocols, including PCI. VESA, Microchannel, ISA, and EISA. The computer system 740 also includes a persistent storage memory 748 (e.g., a hard drive, a floppy drive, a CD ROM drive, magnetic tape drives, flash memory devices, and digital video disks) that is connected to the system bus 746 and contains one or more computer-readable media disks that provide non-volatile or persistent storage for data, data structures and computer-executable instructions.

A user may interact (e.g., enter commands or data, such as but not limited to the numbers of clusters to compute) with the computer system 740 using one or more input devices 750 (e.g., a keyboard, a computer mouse, a microphone, joystick, and touch pad). Information may be presented through a user interface that is displayed to a user on the display 751 (implemented by, e.g., a display monitor), which is controlled by a display controller 754 (implemented by, e.g., a video graphics card). The computer system 740 also typically includes peripheral output devices, such as speakers and a printer. One or more remote computers may be connected to the computer system 740 through a network interface card (NIC) 756.

As shown in FIG. 7, the system memory 744 also stores the image classification system 10, a graphics driver 758, and processing information 160 that includes input data, processing data, and output data. In some examples, the image classification system 10 interfaces with the graphics driver 758 to present a user interface on the display 751 for managing and controlling the operation of the image classification system 10.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in their entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

What is claimed is:

1. A method performed using a physical computer system comprising at least one processor for generating a personal clothing model for use in classifying an image comprising:
   generating, using the computer system, clothing feature data representative of at least one clothing feature using clothing region data representative of clothing regions detected in each image of a subset of images from a collection of images, each clothing region being associated with a same clothing worn by a same person that appears in each image of the subset of images; and
   training, using the computer system, a discriminative clothing classifier using the clothing feature data to generate at least one personal clothing model, wherein the at least one personal clothing model, for use in classifying the image, corresponds to the clothing.

2. The method of claim 1, further comprising using the at least one personal clothing model to classify an additional image in the collection of images that is not contained in the subset.

3. The method of claim 2, wherein the using the at least one personal clothing model to classify an additional image in the collection of images comprises computing a similarity score between the at least one personal clothing model and clothing feature data extracted from image data corresponding to images in the collection of images that are not contained in the subset, performing a clustering based on the computed similarity scores, and determining as an additional image in which the person appears an image whose clothing feature data clusters with the at least one personal clothing model based on the similarity scores.

4. The method of claim 3, further comprising: for the at least one personal clothing model, determining a range of time of capture of the images in the subset, and computing the similarity scores between the at least one personal clothing model and clothing feature data extracted from image data corresponding to images in the collection of images that were captured in the range of time of capture.

5. The method of claim 3, wherein the clothing features is a color signature or a texture signature, and wherein the similarity score is a distance measure, D, between the at least one personal clothing model and clothing feature data extracted from a clothing region, that is obtained according to $D=(DC+DT)/2$, wherein DC is a color-based distance obtained by comparing the color signatures using the EMD metric, and wherein DT is a texture-based distance that is obtained by comparing texture signatures.

6. The method of claim 2, wherein identifying the additional image comprises classifying the image in the collection of images that are not contained in the subset based on clothing co-appearance using the at least one personal clothing model.

7. The method of claim 1, wherein the clothing features is a color signature, a texture signature, or both a color signature and a texture signature.

8. The method of claim 1, wherein the discriminative clothing classifier is a supervised learning algorithm.

9. The method of claim 8, wherein the discriminative clothing classifier is a bagging decision trees classifier.

10. The method of claim 1, further comprising identifying the subset of images by performing a clothing-based clustering of a set of images in which the person appears from the collection of images, and determining the images of a clothing-based cluster as the subset.

11. The method of claim 10, further comprising identifying the set of images in which the person appears by:
    generating face data representing a set of detected faces from image data representing the collection of images using a face detector;
    clustering, based on the face data, images in the collection of images; and
    determining as the set of images the images in a cluster in which the person appears.

12. The method of claim 1, further comprising generating clothing region data, using the computer system, by a method comprising:
    generating face data representing a set of detected faces from image data representing the set of images;

using the face data, defining respective facial regions for identified faces and, on the basis of the facial regions, defining respective corresponding hair regions and clothing regions;

using image data within the facial regions and hair regions, generating a measure of skin tone and hair tone for the person; and using the measures of the skin tone and the hair tone to discard those regions of the image corresponding to skin and hair within the clothing region to provide a clothing mask representing a clothing region of clothing worn by the person.

13. A method performed using a physical computer system comprising at least one processor for classifying an image using at least one personal clothing model, comprising:

using at least one personal clothing model, using a physical computer system, to classify an additional image in a collection of images, wherein the additional image is not contained in a subset of images from the collection of images that is used to train the personal clothing model, and wherein training the personal clothing model comprises:

generating clothing feature data representative of at least one clothing feature using clothing region data representative of clothing regions detected in each image of the subset of images, each clothing region being associated with a same clothing worn by a same person that appears in each image of the subset of images; and training a discriminative clothing classifier using the clothing feature data to produce the at least one personal clothing model, wherein the at least one personal clothing model corresponds to the clothing.

14. The method of claim 13, wherein the using the at least one personal clothing model to classify an additional image in the collection of images comprises computing a similarity score between the at least one personal clothing model and clothing feature data extracted from image data corresponding to images in the collection of images that are not contained in the subset, performing a clustering based on the computed similarity scores, and determining as an additional image in which the person appears an image whose clothing feature data clusters with the at least one personal clothing model based on the similarity scores.

15. The method of claim 14, further comprising: for the at least one personal clothing model, determining a range of time of capture of the images in the subset, and computing the similarity scores between the at least one personal clothing model and clothing feature data extracted from image data corresponding to images in the collection of images that were captured in the range of time of capture.

16. The method of claim 13, wherein the clothing features is a color signature, a texture signature, or both a color signature and a texture signature.

17. The method of claim 13, wherein the discriminative clothing classifier is a bagging decision trees classifier.

18. The method of claim 13, further comprising identifying the subset of images by performing a clothing-based clustering of a set of images in which the person appears from the collection of images, and determining the images of a clothing-based cluster as the subset.

19. Apparatus for processing image data representative of a collection of images, comprising:

a memory storing computer-readable instructions; and a processor coupled to the memory, to execute the instructions, and based at least in part on the execution of the instructions, to perform operations comprising:

generating clothing region data representative of clothing regions detected in each image of a subset of images from a collection of images, each clothing region being associated with a same clothing worn by a same person that appears in each image of the subset of images;

generating clothing feature data representative of at least one clothing feature using the clothing region data; and training a discriminative clothing classifier using the clothing feature data to produce at least one personal clothing model, wherein the at least one personal clothing model, for use in classifying an image, corresponds to the clothing.

20. The apparatus of claim 19, wherein based at least in part on the execution of the instructions, the processor performs operations comprising using the at least one personal clothing model to classify an additional image in the collection of images that is not contained in the subset.

21. At least one non-transitory computer-readable medium storing computer-readable program code adapted to be executed by a computer to implement a method comprising:

generating clothing region data representative of clothing regions detected in each image of a subset of images from a collection of images, each clothing region being associated with a same clothing worn by a same person that appears in each image of the subset of images;

generating clothing feature data representative of at least one clothing feature using the clothing region data;

training a discriminative clothing classifier using the clothing feature data to produce at least one personal clothing model, wherein the at least one personal clothing model corresponds to the clothing; and using the at least one personal clothing model to classify an additional image in the collection of images that is not contained in the subset.

* * * * *